United States Patent [19]

Momoi et al.

[11] Patent Number: 4,679,286
[45] Date of Patent: Jul. 14, 1987

[54] MULTIFACE MACHINING MACHINE TOOL

[75] Inventors: Shoji Momoi, Kagamihara; Sumiaki Inami, Aichi, both of Japan

[73] Assignee: Yamazaki Machinery Works, Ltd., Aichi, Japan

[21] Appl. No.: 828,746

[22] Filed: Feb. 12, 1986

[30] Foreign Application Priority Data

Feb. 25, 1985 [JP] Japan .................................. 60-35912

[51] Int. Cl.$^4$ ...................... B23Q 41/02; B65G 47/00
[52] U.S. Cl. ........................................ 29/33 P; 29/563; 198/346.1; 198/803.2
[58] Field of Search ................... 29/33 P, 33 J, 38 C, 29/563; 144/223; 198/346.1, 465.1, 465.3, 803.2, 803.1

[56] References Cited

U.S. PATENT DOCUMENTS

| | | | |
|---|---|---|---|
| 3,931,882 | 1/1976 | Ossbahr | 198/803.2 |
| 3,979,985 | 9/1976 | Daniels | 29/563 X |
| 4,291,797 | 9/1981 | Ewertowski | 29/33 P X |
| 4,324,027 | 4/1982 | Burkhardt et al. | 29/33 P |
| 4,369,563 | 1/1983 | Williamson | 29/563 X |
| 4,449,277 | 5/1984 | Hasegawa | 29/33 P |
| 4,480,738 | 11/1984 | Mattson | 29/33 P |

FOREIGN PATENT DOCUMENTS

| | | | |
|---|---|---|---|
| 1132409 | 1/1985 | European Pat. Off. | 198/346.1 |
| 134161 | 10/1981 | Japan | 29/33 P |
| 1131 | 1/1984 | Japan | 29/563 |

Primary Examiner—William R. Briggs
Attorney, Agent, or Firm—Cushman, Darby & Cushman

[57] ABSTRACT

There are provided workpiece rotatably holding means for rotatably holding a pallet at a position opposite to a spindle, a pallet changer provided with a main body rotatably holded and formed with a plurality of wings arranged in a windmill shape, and workpiece supporting means for loading the pallet on each one of the wings, and an intermediate station for transferring a workpiece between the workpiece rotatably holding means and the pallet changer. The workpiece to be machined is loaded on each wing of the pallet changer, transferred to the workpiece rotatably holding means through the intermediate station and subjected to the machining there. After being machined, the workpiece is transferred back to the pallet changer through the intermediate station.

2 Claims, 4 Drawing Figures

MULTIFACE MACHINING MACHINE TOOL

BACKGROUND OF THE INVENTION

This invention relates to a multiface machining machine tool for machining a plurality of faces or multiface of a workpiece.

In recent years, various kinds of the so-called multiface machining machine tools are supplied to the market. However, any one of them is merely a single body of a machine tool; in other words, much attention is not paid to means for feeding a workpiece to the machine tool. Therefore, there is a strong demand of a development of a multiface machining machine tool with a system for efficiently feeding a workpiece.

SUMMARY OF THE INVENTION

In order to eliminate the aforementioned drawback of the conventional machine tools, the present invention aims at providing a multiface machining machine tool which is simple in its construction and yet capable of efficiently feeding a workpiece.

That is, the present invention comprises workpiece rotatably holding means for rotatably holding a pallet at a position opposite to a spindle, a pallet changer provided with a main body rotatably held by driving means and formed with a plurality of wings arranged in a windmill shape, and workpiece supporting means for loading the pallet on the wings, and an intermediate station for transferring a workpiece between the workpiece rotatably holding means and the pallet changer.

Due to the foregoing constitution, the workpieces to be machined are loaded on the respective wings of the pallet changer, transferred to the workpiece rotatably holding means through the intermediate station and subjected to the machining there. After being machined, the workpieces are transferred back to the pallet changer via the intermediate station again.

DESCRIPTION OF THE PREFERRED EMBODIMENT

A preferred embodiment of the present invention will be described with reference to the accompanying drawings.

Figure 1:
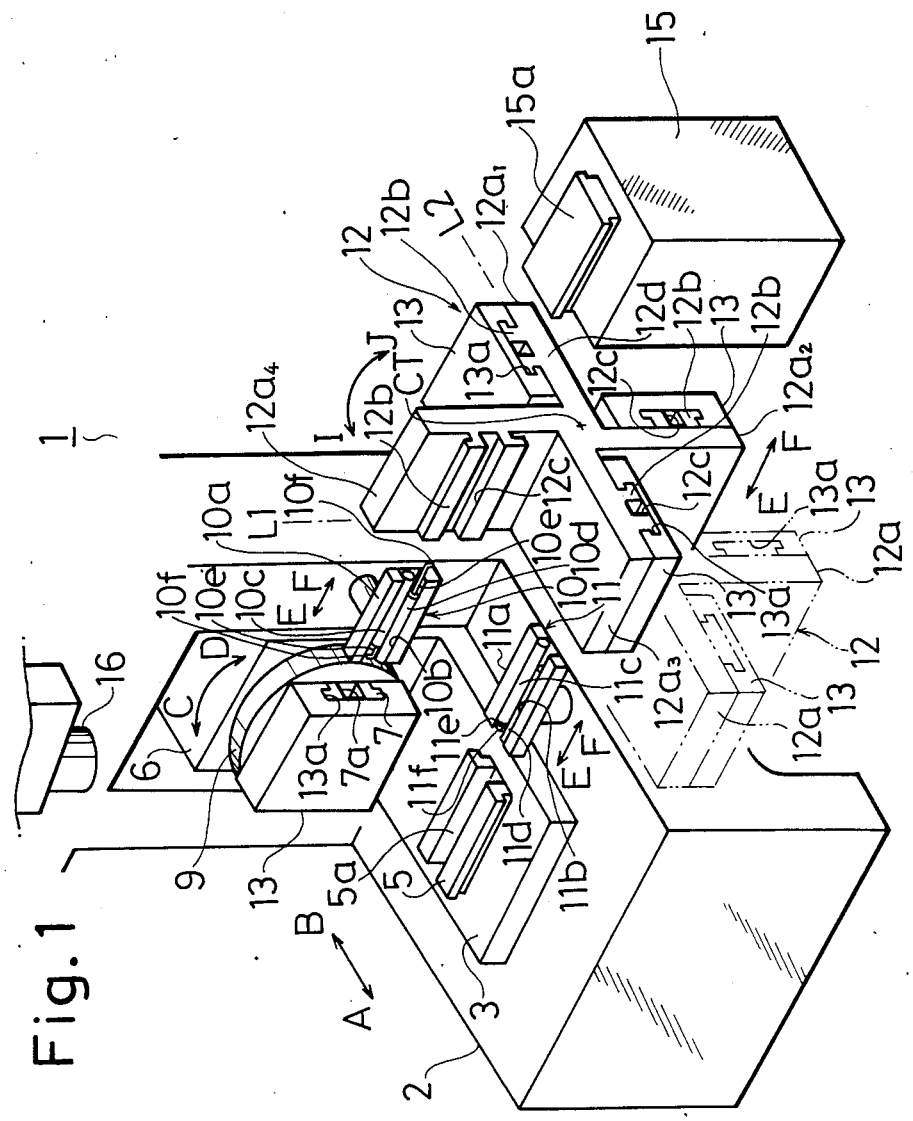
FIG. 1 is a perspective view of one embodiment of a multiface machining machine tool according to the present invention.
Figure 2:
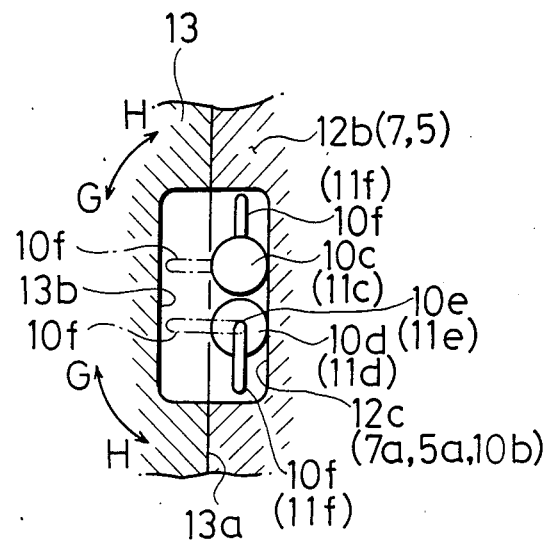
FIG. 2 is an illustration for showing a transfer cylinder of an intermediate station.

A multiface machining machine tool 1, as shown in FIG. 1, includes a frame 2. Movably provided on the frame 2 is a table 3 for movement in the direction as shown by arrows A and B. Provided on the table 3 are a workpiece supporting table 5 and a workpiece rotating apparatus 6. The workpiece rotating apparatus 6 is provided with a turn table 9 attached with a workpiece supporting table 7 and rotatable in the directions as shown by arrows C and D. The workpiece supporting tables 5 and 7 are formed in a character "T" shape in section, and the central portions thereof are formed with grooves 5a and 7a. The frame 2 is provided thereon with intermediate stations 10 and 11 at positions opposite to the respective workpiece supporting tables 7 and 5. The respective intermediate stations 10 and 11 include workpiece supporting bodies 10a and 11a formed likewise in a character "T" shape in section as in the case of the workpiece supporting tables 5 and 7. The respective workpiece supporting bodies 10a and 11a are formed with grooves 10b and 11b so that the grooves 10b and 11b will be in conformity with the grooves 7a and 5a. Disposed in the respective grooves 10b and 11b are transfer cylinders 10c, 10d, 11c and 11d provided with engaging rods 10e and 11e for projection in the directions as shown by arrows E and F. Arrangement being such that the engaging rods 10e and 11e of the transfer cylinder 10c and 11c are projectable to the table 3 side, while the engaging rods 10e and 11e of the transfer cylinders 10d and 11d are projectable to the opposite direction. The respective engaging rods 10e and 11e are formed at the front ends thereof with engaging portions 10f and 11f which are bent in a hook shape. Further, the respective engaging rods 10e and 11e, as shown in FIG. 2, are rotatable in the directions as shown by arrows G and H within the range of 90°.

Figure 3:
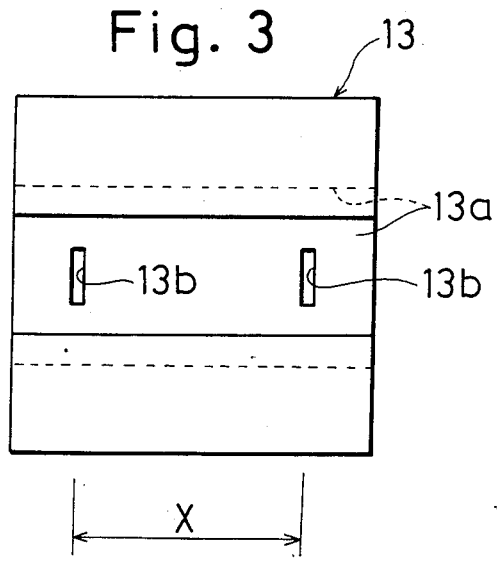
FIG. 3 is a bottom view of a pallet.

By the way, the frame 2 is provided at its right side surface in FIG. 1 with a pallet changer 12 formed in a shape of a windmill. The pallet changer 12 is held by the frame 2 as such that a main body 12d is movable in the directions as shown by arrows A and B; and the directions as shown by arrows E and F with respect to the frame 2. The main body 12d is provided as such that it is rotatable in the directions as shown by arrows I and J about a center CT. The main body 12d is formed with 4 wings $12a_1$, $12a_2$, $12a_3$ and $12a_4$ arranged at 90° pitches in a radial fashion about the center CT. Each of the wings 12a is formed with a workpiece supporting table 12b. The workpiece supporting table 12b is formed with a groove 12c, so that the groove 12c will be in conformity with the respective grooves 10b and 11b of workpiece supporting bodies 10a, 11a. The workpiece supporting table 12b can be attached with a pallet 13 for loading thereon a workpiece to be machined. In this case, an engaging groove 13a having a T-shape formed in a lower surface of the pallet 13 is brought to be in engagement with the workpiece supporting table 12b. The engaging groove 13a of each of the pallets 13, as shown in FIG. 3, is formed at both end portions of the groove 13a with engaging holes 13b, 13b.

The pallet changer 12 is provided at its right location in FIG. 1 with a loading station 15 for the pallet 13. The loading station 15 is provided with a workpiece supporting table 15a formed in a character "T" shape in section. The loading station 15 serves to transfer the pallet 13 loaded with a workpiece to be machined to the pallet changer 12 side and receive the pallet 13 loaded with a workpiece after machined from the pallet changer 12.

On the other hand, disposed at an upper location of the frame 2 in FIG. 1 and opposite to the workpiece rotating apparatus 6 and the workpiece supporting table 5 is a spindle 16 for mounting thereon with a tool for rotation.

Since the multiface machining machine tool 1 is constituted as mentioned in the foregoing, when a workpiece is machined, firstly, the pallet 13 loaded with the workpiece to be machined is loaded on each of the wings 12a of the pallet changer 12 from the loading station 15. When loading, the workpiece supporting table 15a mounted on the loading station 15 is loaded thereon with the pallet 13 loaded with the workpiece.

In this case, the workpiece supporting table 15a is inserted in the engaging groove 13a of the pallet 13 for engagement. Then, the pallet changer 12 is moved in the arrow F direction in order to bring the pallet 13 loaded on the laoding station 15 in opposite conformity relation with the wing 12a₁ of the pallet changer 12. In the foregoing state, the pallet 13 on the loading station 15 is transferred onto the workpiece supporting table 12b on the wing 12a₁ (the transfer means of the pallet is not shown, but such known pallet transfer means as a driving apparatus using a cylinder, an apparatus using a chain or the like may be employed for it). When the loading of the workpiece on the wing 12a₁ is completed, the pallet changer 12 is rotated by 90° to bring the wing 12a₂ in opposite relation with the loading station 15. In the foregoing state, another pallet 13 is transferred onto the wing 12a₂ from the loading station 15. In this way, the pallet changer 12 is rotated by 90° each time to load the workpieces on the respective wings 12a together with the pallets 13.

When the loading of the pallets 13 onto all of four wings 12a is completed, the pallet changer 12a is moved in the direction E, i.e. toward the frame 2 side. Then, the pallet changer 12 is rotated to bring the pallet 13 loaded thereon with a workpiece which is to be machined first to a workpiece feeding location L1 opposite to the intermediate station 10. In the foregoing state, the transfer cylinder 10d of the intermediate station 10 is actuated to project the engaging rod 10e in the direction as shown by arrow F, i.e. toward the pallet 13 side which is now positioned in the workpiece feeding location L1. During the movement of the engaging rod 10e in the the direction as shown by arrow F, the rod 10e is engaged in the groove 12c of the workpiece supporting table 12b and further moved by a predetermined quantity in the F direction. Due to the foregoing, the engaging portion 10f of the engaging rod 10e and the engaging hole 13b of the pallet 13 loaded on the workpiece supporting table 12b are brought to be opposite with respect to each other, as shown in FIG. 2 (the pallet 13 is formed with two engaging holes 13b, one at the frame 2 side and the other at the loading station 15 side along the engaging groove 13a, and the engaging hole 13b just referred to is the one at the loading station 15 side). At this time point, when the engaging rod 10e is rotated by 90° in the direction as shown by arrow G, the engaging portion 10f is inserted in the engaging hole 13b of the pallet 13 for engagement from the groove 12c of the workpiece supporting table 12b. Then, the engaging rod 10e is caused to retreat in the direction as shown by arrow E this time. Due to the foregoing, the engaging portion 10f and the engaging hole 13b are brought to be in abutting engagement with respect to each other to cause the pallet 13 to move in the E direction along the workpiece supporting table 12b. Due to the foregoing, the pallet 13 is transferred onto the workpiece supporting body 10a of the intermediate station 10 from the pallet changer 12. When the pallet 13 is transferred onto the intermediate station 10, the engaging rod 10e is rotated again in the direction as shown by arrow H in FIG. 2. The engaging portion 10f is disengaged from the engaging hole 13b of the pallet 13 and inserted in the groove 10b for rest as shown by the solid line in FIG. 2.

Then, the engaging rod 10e of the transfer cylinder 10c is rotated by 90° in the arrow G direction as shown in FIG. 2 to cause the engaging hole 13b at the turn table 9 side of the pallet 13 to engage with the engaging portion 10f this time. Since the distance between the engaging portions 10f of the engaging rods 10e of the transfer cylinders 10c and 10d is equal to the distance X between the engaging holes 13b, 13b as shown in FIG. 3 in the state that the engaging rods 10e are retreated, engaging action between the engaging rod 10e of the transfer cylinder 10c and the engaging hole 13b is performed smoothly. When the engaging rod 10e is engaged in the engaging hole 13b, the transfer cylinder 10c is actuated to project the engaging rod 10e in the arrow E direction, i.e. toward the turn table 9 side in order to transfer the pallet 13 on the workpiece supporting body 10a onto the workpiece supporting table 7 on the turn table 9 by the engaging rod 10e this time. At this time, since the engaging rod 10e is moved in such a manner as to insert in the groove 7a of the workpiece supporting table 7, the engaging rod 10e can smoothly transfer the pallet 13 without interferring with the workpiece supporting table 7.

When the pallet 13 is transferred onto the workpiece supporting table 7, the workpiece rotating apparatus 6 is actuated to rotate the turn table 9 together with the pallet 13 to cause the face of the workpiece to be machined to face upwardly in FIG. 1, i.e., toward the spindle 16 attached with a tool. In the foregoing state, the spindle 16 is actuated to move the table 3 in the directions as shown by arrows A and B and a predetermined machining is effected to the workpiece in the meantime. When the machining to a predetermined face of the workpiece is completed, the workpiece rotating apparatus 6 is actuated again to rotate the turn table 9 together with the pallet 13 by a predetermined angle to bring another face to be machined next to a location opposite to the spindle 16. In the foregoing state, the machining is effected by the spindle 16. In this way, the pallets 13 are rotated together with workpieces one after another and all side faces of the workpieces on the pallets 13 are machined by the spindle 13 in the meantime.

In order to machine the upper face of the workpiece after the machining to the side faces of the workpiece is completed, the turn table 9 is rotated to bring the groove 7a of the workpiece supporting table 7 to a location opposite to the groove 10b of the workpiece supporting body 10a. In the foregoing state, the pallet 13 is transferred to the workpiece supporting body 10a side from the workpiece supporting table 7 by the transfer cylinder 10c and further transferred from the workpiece supporting body 10a to the workpiece supporting table 12b of the wing 12a of the pallet changer 12, to which the pallet 13 was attached before, in the reverse manner with respect to the already mentioned case. After the pallet 13 is transferred back onto the pallet changer 12, the pallet changer 12 is rotated by 90° in the direction as shown by the arrow J to move the pallet 13 from the location where the pallet 13 was supported in its vertical posture to a location L2 where the pallet 13 is supported in its horizontal posture (that is, the location where the wing 12a₁ is located in FIG. 1). Then, the pallet changer 12 is moved in the direction as shown by the arrow A in FIG. 1 this time to bring the pallet 13 in the location L2 opposite to the workpiece supporting body 11a of the intermediate station 11. In the foregoing state, the pallet 13 is transferred from the pallet changer 12 onto the workpiece supporting table 5 via the workpiece supporting body 11a by the transfer cylinders 11d and 11c of the intermediate station 11. Since the workpiece supporting table 5 is disposed in its horizontal posture, the pallet 13 on the workpiece supporting table 5 (therefore, the workpiece on the pallet 13) is supported by the table 5 with its upper face held opposite to the spindle 16.

In the above-mentioned state, the table 3 is moved in the directions as shown by the arrows A and B, and a predetermined machining is effected to the upper face of the workpiece by the spindle 16 in the meantime. In this way, all faces of the workpiece on the pallet 13 only excepting the lower face contacting the pallet 13 have been machined by this time. When the machining to the upper face of the workpiece is completed, the pallet 13 loaded with the workpiece is transferred back to the pallet changer 12 via the intermediate station 11. The pallet changer 12 transfers the pallet 13 loaded thereon with a workpiece to be machined next to the intermediate station 10 or 11 and a predetermined machining is kept continued.

Figure 4:
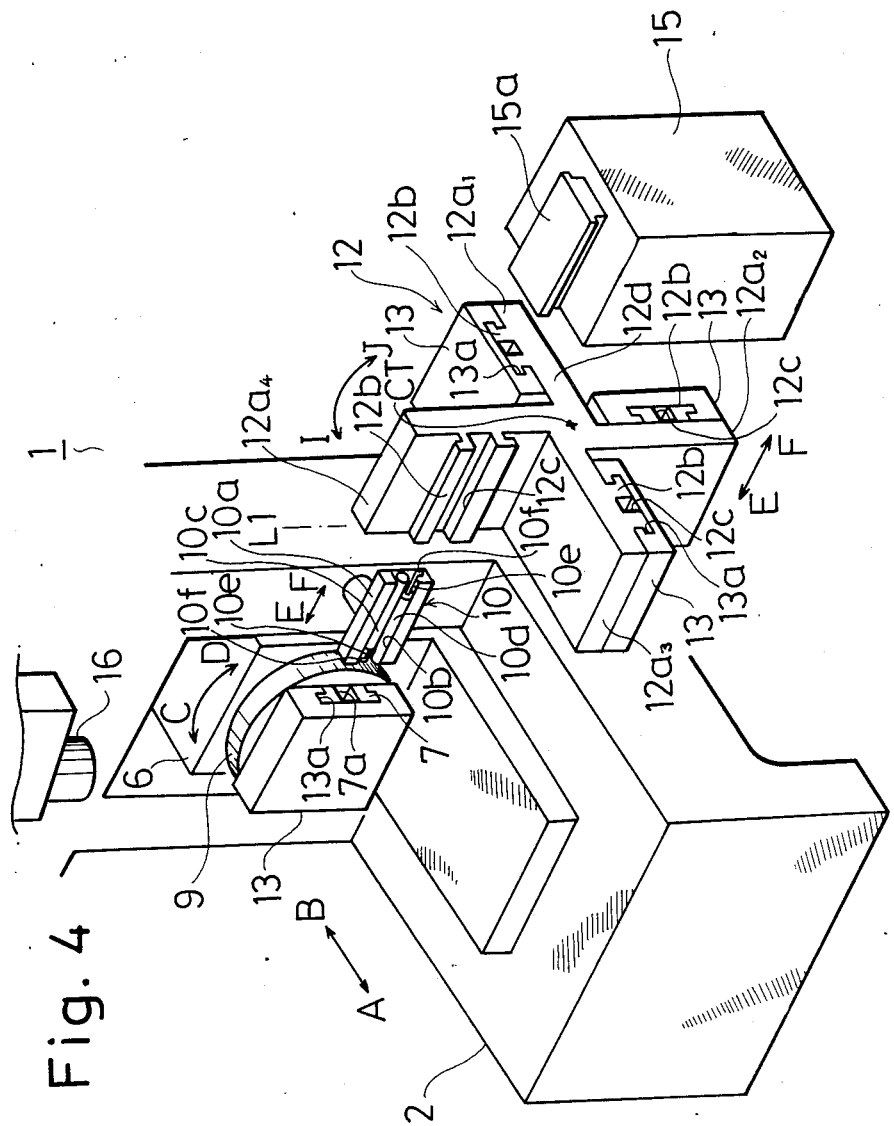
FIG. 4 is a perspective view showing another embodiment of the present invention.

In the above embodiment, the table 3 is provided thereon with two workpiece supporting tables 5 and 7 in order to machine 5 faces of the workpiece. Alternatively, the table 3 may of course be provided with only the workpiece supporting table 7 at the workpiece rotating apparatus 6 side to machine only the side faces of the workpiece depending on the purposes of the machining, as shown in FIG. 4. In this case, since the pallet changer 12 is not required to be moved in the directions as shown by the arrows A and B, the driving mechanism of the pallet changer 12 can be made simple. Although the workpiece supporting table 5 and 7 are disposed in such positions as being displaced by 90° with respect to each other as shown in FIG. 1, they may of course be disposed by desired angles.

Furthermore, the number of the wings 12a of the pallet changer 12 is not limited to 4 as mentioned in the above embodiment. Alternatively, they may be any desired number as long as they are more than 2.

As described in the foregoing, the present invention comprises workpiece rotatably holding means for rotatably holding a pallet at a position opposite to a spindle, a pallet changer provided with a main body rotatably holded and formed with a plurality of wings arranged in a windmill shape, and workpiece supporting means loading the pallet on each one of the wings, and an intermediate station for transferring the workpieces between the workpiece rotatably holding means and the pallet changer. Accordingly, workpieces can be continuously fed to the workpiece rotatably holding means through the pallet changer 12. Thus, an efficient machining operation can be obtained.

Furthermore, in addition to the foregoing constitution, if the invention includes another workpiece holding means for holding a face of the workpiece other than the face machined by the tool of the spindle when the aforementioned workpiece rotatably holding means is holding the workpiece opposite to the spindle, a pallet changer movably disposed between the workpiece rotatably holding means and the workpiece holding means, and an intermediate station adapted to transfer the workpiece between the workpiece holding means and the pallet changer, the workpiece can be efficiently fed to a machine tool for machining 5 faces of the workpiece.

Although the present invention has been described with reference to the preferred embodiment, the embodiment described herein is for illustrative purposes only and not in limitation thereof. Also, the scope of the present invention is defined in the appended claims and will not be binded by description of the embodiment. Accordingly, it will be understood that all changes and modifications which belong to the appended claims fall within the true spirit and scope of the present invention.

What is claimed is:

1. A multiface machining machine tool including a spindle for mounting a tool thereon and being capable of machining at least two faces of a workpiece loaded on a pallet by means of said tool, whereby said multiface machining machine tool comprises:
    a workpiece rotatably holding means for rotatably holding said pallet at a position opposite to said spindle;
    a workpiece holding means for holding a face of the workpiece other than the face machined by the tool of the spindle when said workpiece rotatably holding means is holding the workpiece opposite to the spindle;
    a pallet changer provided with a main body rotatably held by a driving means and formed with a plurality of wings arranged in a windmill shape, and workpiece supporting means for loading a pallet on each one of said wings; and
    an intermediate station having transfer means for transferring the workpiece between said workpiece rotatably holding means, workpiece holding means, and said pallet changer.

2. A multiface machining machine tool including a spindle for mounting a tool thereon and being capable of machining at least two faces of a workpiece loaded on a pallet by means of said tool, thereby said multiface machining machine tool comprises:
    a workpiece rotatably holding means for rotatably holding said pallet at a position opposite to said spindle;
    a workpiece holding means for holding a face of the workpiece other than the face machined by the tool of the spindle when said workpiece rotatably holding means is holding the workpiece opposite to the spindle;
    a pallet changer provided with a main body rotatably held by driving means and formed with a plurality of wings arranged in a windmill shape, and workpiece supporting means for loading the pallet on each one of said wings;
    said pallet changer being movably disposed between said workpiece rotatably holding means and said workpiece holding means linearly; and
    an intermediate station having transfer means for transferring the workpiece between said workpiece rotatably holding means, workpiece holding means, and said pallet changer.

* * * * *